US010839735B2

(12) United States Patent
Tao et al.

(10) Patent No.: US 10,839,735 B2
(45) Date of Patent: Nov. 17, 2020

(54) TECHNIQUES FOR DETERMINING EFFECTIVE COLOR SPACE OF A DISPLAY

(71) Applicant: Microsoft Technology Licensing, LLC, Redmond, WA (US)

(72) Inventors: Simon Young Tao, Redmond, WA (US); David Foster Spruill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/237,030

(22) Filed: Dec. 31, 2018

(65) Prior Publication Data

US 2020/0211439 A1    Jul. 2, 2020

(51) Int. Cl.
*G09G 3/20* (2006.01)

(52) U.S. Cl.
CPC .... *G09G 3/2003* (2013.01); *G09G 2320/0666* (2013.01); *G09G 2340/06* (2013.01)

(58) Field of Classification Search
None
See application file for complete search history.

(56) References Cited

U.S. PATENT DOCUMENTS

| 5,416,890 A | * | 5/1995 | Beretta | G06F 3/04845 345/440 |
| 2008/0259369 A1 | * | 10/2008 | Kanai | G06T 11/001 358/1.9 |
| 2019/0379893 A1 | * | 12/2019 | Krishnan | H04N 19/132 |

* cited by examiner

*Primary Examiner* — Tize Ma
(74) *Attorney, Agent, or Firm* — Arent Fox LLP (57) ABSTRACT

Described are examples for determining an effective color space of a display. A two-dimensional parametric surface that intersects a color volume defined for the display can be defined for at least one color volume vertex. A flat bitmap to which the two-dimensional parametric surface is mapped can be displayed, on the display, for the at least one color volume vertex. A selection of a point on the flat bitmap that corresponds to a perceived maximum color can be received for the at least one color volume vertex. The effective color space of the display can be determined based at least in part on the perceived maximum color selected for the at least one color volume vertex.

20 Claims, 6 Drawing Sheets

TECHNIQUES FOR DETERMINING EFFECTIVE COLOR SPACE OF A DISPLAY

BACKGROUND

Many modern display devices are scene-referred color space devices where the video source expects that colors in an image are accurately reproduced, in a colorimetric sense, on the display, to within a reasonable tolerance. Such scene-referred displays can require physical calibration to determine the effective color space, including luminance and chrominance, which is reported to a video source for displaying images; effective color space is defined based on how bright and/or dark the display can get (e.g., peak and/or minimum luminance) and how saturated the colors can get (e.g., red, green, and blue primaries). Display devices can be calibrated using a colorimeter external to the display to accurately measure color output by the display. Such calibration can be expensive and time consuming, and as such, can be impractical for many consumer-level displays, for example. Scene-referred display devices can also be calibrated by displaying saturated color patches (where the display can truncate the encoded color signal to the closest physically possible color), allowing a user to adjust one color patch to match the other, and then determining the maximum possible signal along a single color dimension the display can physically reproduce based on the adjustment. Such calibration only allows for characterizing the display along a single color dimension at a time, while effective color space requires characterization across multiple color dimensions.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for determining an effective color space of a display is provided. The method includes defining, for at least one color volume vertex, a two-dimensional parametric surface that intersects a color volume of the display, displaying, on the display and for the at least one color volume vertex, a flat bitmap to which the two-dimensional parametric surface is mapped, receiving, for the at least one color volume vertex, a selection of a point on the flat bitmap that corresponds to a perceived maximum color, and determining, based at least in part on the perceived maximum color selected for at least one color volume vertex, the effective color space of the display.

In another example, a device for determining an effective color space of a display is provided that includes a memory storing one or more parameters or instructions for determining the effective color space of the display, and at least one processor coupled to the memory. The at least one processor is configured to define, for at least one color volume vertex, a two-dimensional parametric surface that intersects a color volume of the display, display, on the display and for the at least one color volume vertex, a flat bitmap to which the two-dimensional parametric surface is mapped, receive, for the at least one color volume vertex, a selection of a point on the flat bitmap that corresponds to a perceived maximum color, and determine, based at least in part on the perceived maximum color selected for the at least one color volume vertex, the effective color space of the display.

In another example, a non-transitory computer-readable medium including code executable by one or more processors for determining an effective color space of a display is provided. The code includes code for defining, for at least one color volume vertex, a two-dimensional parametric surface that intersects a color volume of the display, displaying, on the display and for the at least one color volume vertex, a flat bitmap to which the two-dimensional parametric surface is mapped, receiving, for the at least one color volume vertex, a selection of a point on the flat bitmap that corresponds to a perceived maximum color, and determining, based at least in part on the perceived maximum color selected for the at least one color volume vertex, the effective color space of the display.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to determining an effective color space of a display. In particular, the various examples allow for determining the effective color space in multiple dimensions without using special equipment. The effective color space may refer to a range of colors a display is capable of effectively displaying (e.g., the range of colors the display can distinctly display), and may be represented over multiple dimensions (e.g., a three-dimensional cube). For example, for one or more color volume vertices, a two-dimensional parametric surface that intersects the full three-dimensional color volume defined for the display can be determined, and a representative flat bitmap can be displayed. A color volume vertex can be defined to include a color primary (e.g., red, blue, green), white point, black point, or similar extrema on the outer surface of the color volume for a display. In addition, the color volume vertex may include a point within the color volume that exhibits a similar color behavior change, such as the maximum 100 percent window white point, sometimes referred to as Society of Motion Picture and Television Engineers (SMPTE) standard (ST).2086 Maximum Frame Average Light Level (MaxFALL). For a given color volume vertex, a selection of a point on the flat bitmap that corresponds to a perceived maximum color can be received. The effective color space for the display can be determined based on the selected points for each color volume vertex. This can allow a user to quickly measure the effective color space for the display by selecting the point(s) on the flat bitmap(s) for the one or more color volume vertices without special equipment. The selected point(s) can be mapped back to maximum color value(s) for determining the effective color space, which can be provided to a source to optimize display of one or more images based on the effective color space of the display. In addition, using two parameterized dimensions for determining the effective color space, in this regard, can account for more variance represented between color channels, as compared to single-dimension color patch approaches.

In an example, the color volume vertices can include at least one red color primary, at least one green color primary, at least one blue color primary, at least one white point (e.g., for luminance), and/or at least one black point. Using the multiple color volume vertices can allow for mapping a three-dimensional color volume for a display to multiple two-dimensional patterns that can be used to identify relevant saturation points for each of the color volume vertices. In a specific example, for each color volume vertex, the two-dimensional test pattern can be defined by a parametric equation for the color volume vertex based on holding one dimension constant (e.g., constant luminance for red, green, blue primaries). In a more sophisticated example, for the white point and black point, the two-dimensional test pattern can be defined a parametric equation that varies the correlated color temperature (CCT) in one dimension and luminance in the other. In addition, the two-dimensional patterns can be mapped to a flat bitmap based on applying a filter to convert collections of neighboring pixels into discrete color blocks. A user can view each of the flat bitmaps and can select a point where the colors appear to converge or are perceived to be indistinguishable, which can be representative of the maximum color saturation achieved by the display. This selected point can be mapped back to the maximum color saturation for the given color volume vertex and can be used to determine and/or report an effective color space for the display.

Figure 1:
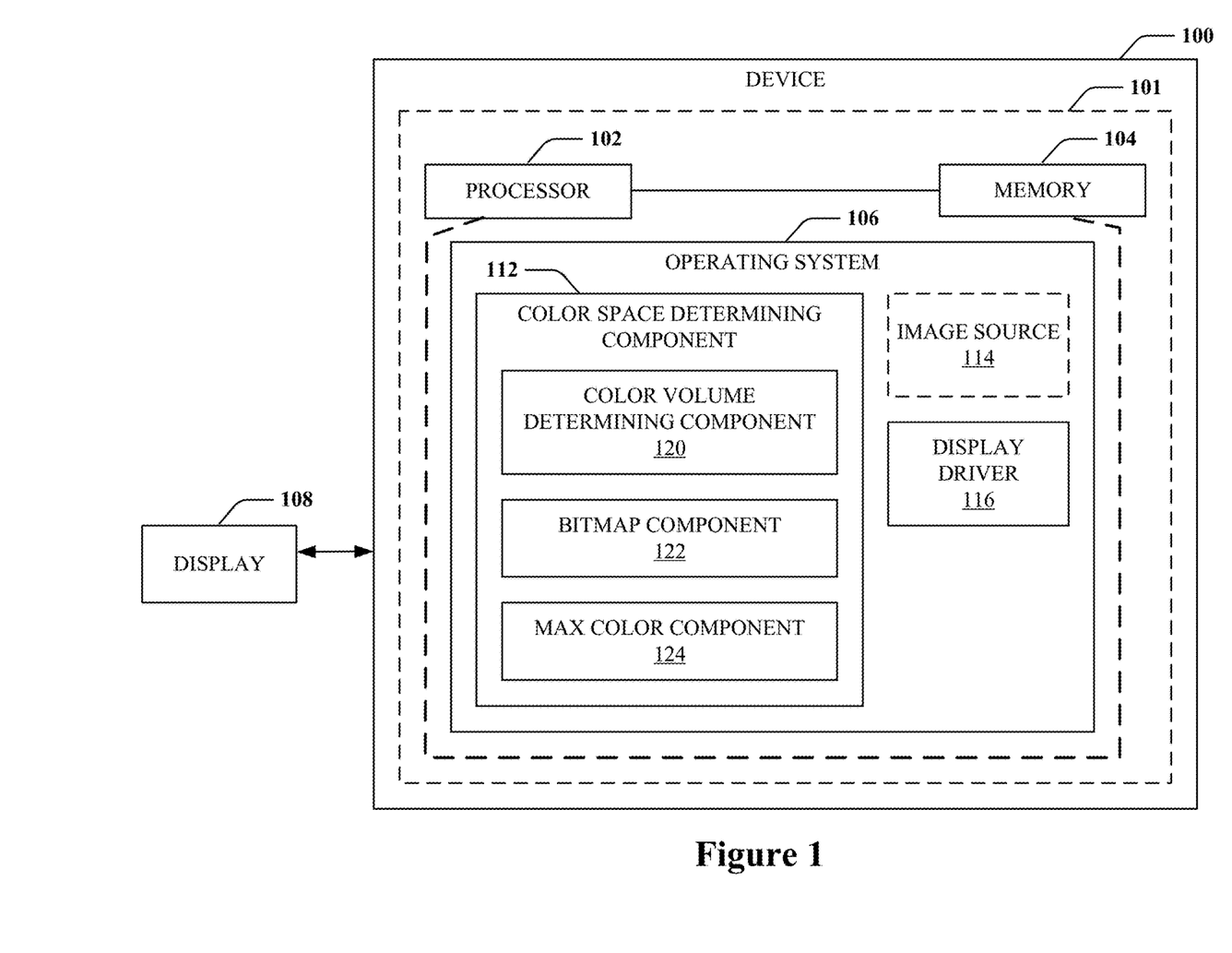
FIG. 1 is a schematic diagram of an example of a device that can determine an effective color space of a display in accordance with examples described herein.
Figure 2:
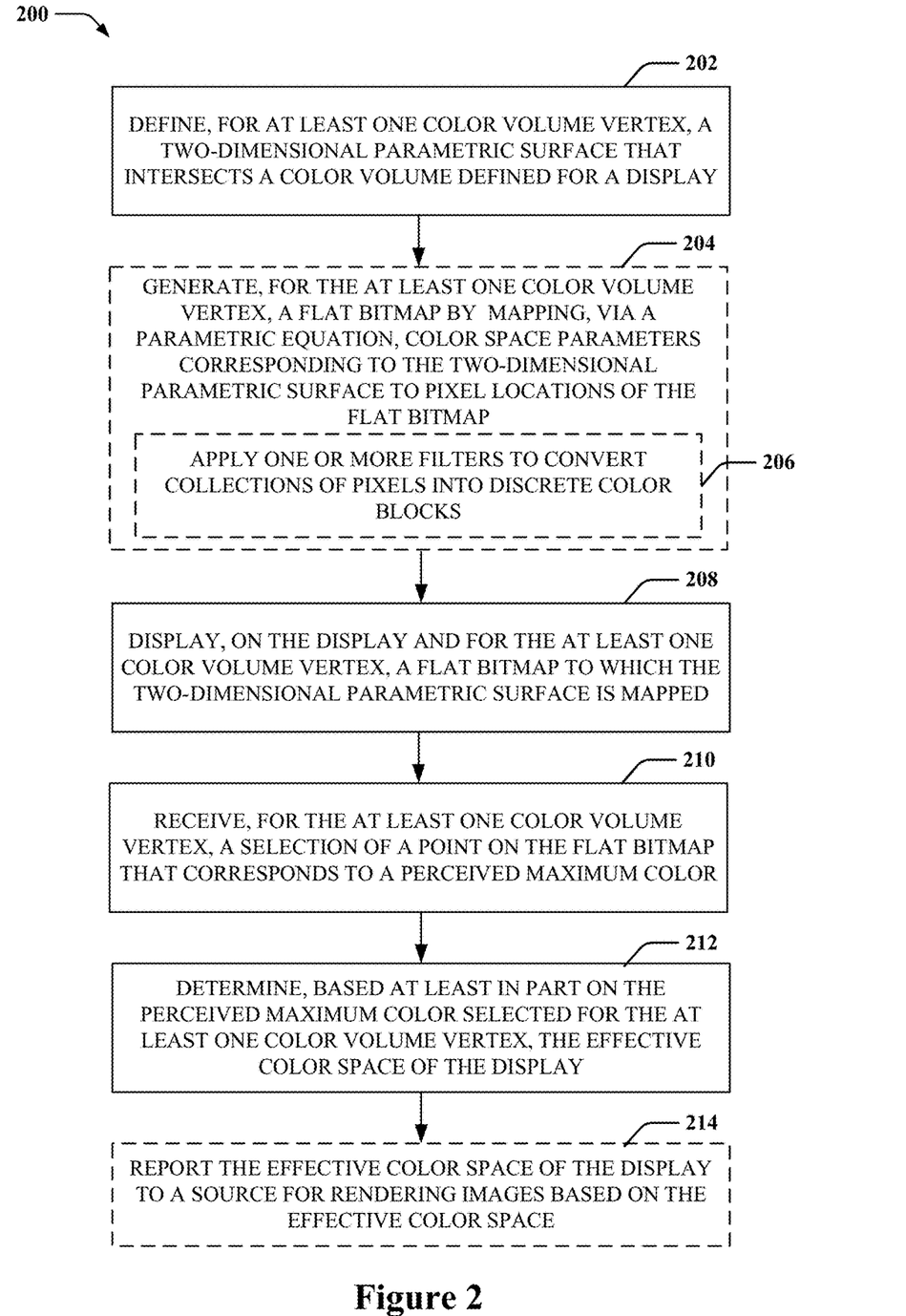
FIG. 2 is a flow diagram of an example of a method for determining an effective color space of a display in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that determine an effective color space of a display. In an example, device 100 can include a processor 102 and/or memory 104 configured to execute or store instructions or other parameters related to providing an operating system 106, which can execute one or more applications, services, etc. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In addition, for example, device 100 may be communicatively coupled to one or more displays, such as display 108, which may include liquid crystal display (LCD) devices, light emitting diode (LED) LCD devices (e.g., having an LED backlight), digital light processing (DLP) display, or substantially any scene-referred color space display having an effective color space that can, for example, be determined based on luminance and chrominance values. The display 108 can display images generated and provided by the device 100 via operating system 106, applications executing thereon, etc., as described further herein. In an example, the display 108 may be one or more displays in a display device, that may include additional hardware components (not shown) to facilitate displaying images, such as one or more display ports, a memory, a backlight, a timing controller, and/or the like.

The one or more applications, services, etc. executing on the operating system 106 may include a color space determining component 112 for determining an effective color space of a display, an optional image source 114 for generating images to be displayed on the display 108 based on the effective color space, and/or a display driver 116 for communicating image data from device 100 to the display 108 (e.g., via a display interface and/or display port, which are not shown). In an example, color space determining component 112 can include a color volume determining component 120 for determining a three-dimensional color space that the display 108 may be capable of displaying (e.g., a color space that is at least as deep as the effective color space), a bitmap component 122 for generating a flat bitmap representative of a two-dimensional parametric surface of the three-dimension color space for displaying on the display 108, and/or a max color component 124 for determining a maximum color observed in the flat bitmap via display 108. Using this information for one or more of a set of color volume vertices, color space determining component 112 can determine at least a portion of an effective color space of the display 108, as described herein.

FIG. 2 is a flowchart of an example of a method 200 for determining an effective color space for a display. For example, method 200 can be performed by a device 100, and/or one or more components thereof, to determine an effective color space of a display 108. In addition, in an example, the display 108 itself may include the color space determining component 112 and/or components thereof to determine its effective color space for reporting to device 100.

In method 200, at action 202, a two-dimensional parametric surface that intersects a three-dimensional color space for a display can be defined for at least one color volume vertex. In an example, color volume determining component 120, e.g., in conjunction with processor 102, memory 104, operating system 106, color space determining component 112, etc., can define, for the at least one color volume vertex, a two-dimensional parametric surface that intersects a color volume defined for the display (e.g., display 108). For example, color space determining component 112 can determine the color volume for the display 108, which may be based on information of the display 108 that may be obtained from display driver 116. For example, the information may indicate a color depth of the display for displaying images, such as a color volume or range and/or bit depth. For example, the display may be a high dynamic range (HDR) display, which can be capable of HDR color volume (e.g., International Telecommunication Union Recommendation (ITU-R) BT.2020 color volume) and a 10-bit bit depth. Other color volumes and/or bit depths can be determined for various other types of displays.

In addition, HDR10 displays also support SMPTE ST 2086 "Mastering Display Color Volume" static metadata to send color calibration data of the mastering display, such as MaxFALL, Maximum Content Light Level (MaxCLL), and/or other static values encoded as supplemental enhancement information (SEI) messages within the video stream. Determining the effective color space for the display, as described herein, can be used as the metadata, or as a replacement to the metadata, for this standard or related SEI messages, in one example.

In any case, color volume determining component 120 can define the two-dimensional parametric surface for a given color volume vertex based on the color volume for the purpose of displaying a wide variety of colors corresponding to the color volume vertex. For example, color volume determining component 120 can define the two-dimensional parametric surface based at least on selecting a constant value for one dimension of the three-dimensional color volume and varying values of the other two dimensions. Thus, for example, where the color volume can be represented as a three-dimensional "cube," color volume determining component 120 can define the two-dimensional parametric surface as a flat "slice" of the "cube," where the slice can be a two-dimensional layer along the third dimension. For example, the selected slice may additionally or alternatively be at an off-axis angle in the "cube," a curved or otherwise non-flat "slice," a higher-detail selection of the "cube," or substantially any portion of the "cube" that can be reduced to a parametric equation thereof.

In one example, the color volume may use Commission on Illumination (CIE) xyY coordinates: r (u,v)=(x,y,Y). In this example, color space determining component 112 may define the two-dimensional parametric surface to have one or more of the following properties: input parameters (u, v) can be defined over the range [0, 1], and therefore the parametric surface can have four vertices (e.g., corners) and four edges corresponding to the extremes of input parameters (u, v); the vertices of the parametric surface can encompass as many possible colors that correspond to what a display may have for the selected color volume vertex given the color volume—in one example, this can correspond to a set of reasonable display primary values chosen empirically, for example by surveying the color volume vertex values for in-market displays; and no vertex may exceed the signaling color space of the display (e.g. HDR10)—that is, it is possible to encode every point within the parametric surface in the display's signaling color volume. In addition, for example, it may not be possible for a parametric surface to encompass all possible colors for a color volume vertex in a three-dimensional color space volume. Thus, for example, color volume determining component 120 can rely on the observation that in-market displays' color volume vertices primarily vary in two independent dimensions, which can be represented by a parametric surface. In one example, the two-dimensional parametric surface for one or more color volume vertices may be determined offline and provided to the color volume determining component 120 for generating a flat bitmap for displaying, as described further herein.

Figure 3:
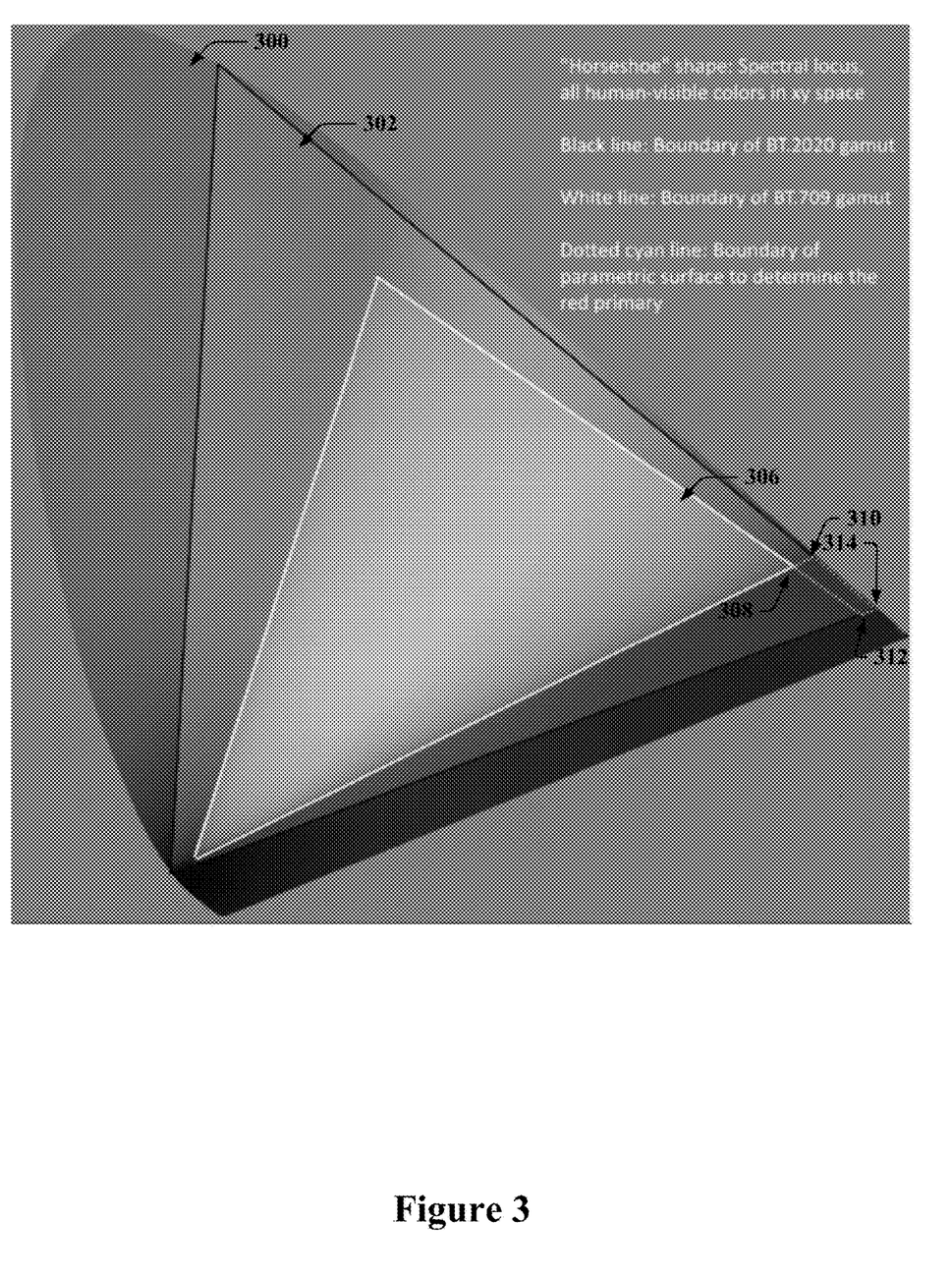
FIG. 3 is a diagram of a monochrome representation of an example of a 2-dimensional parametric surface used to measure the red color primary.

In one specific example, color volume determining component 120 can define a parametric surface for the red primary as shown in FIG. 3. FIG. 3 illustrates a visual representation of colors perceptible by the human eye 302, along with a definition of the BT.2020 color space 304 and a definition of the BT.709 color space 306 as follows: input parameters (u, v) map to the CIE xyY color space r (u,v)= (x,y,Y). Y (luminance) can be held at a constant value throughout the function, to effectively generate a "slice" of the color space along the xy chromaticity axes. The vertices of the surface in xy space can be: vertex 308 (red in the BT.709 color space); vertex 310 (projection of the green to red line in the BT.709 color space onto the BT.2020 color space boundary); vertex 312 (projection of the blue to red line in the BT.709 color space onto the BT.2020 color space boundary); and vertex 314 (red in the BT.2020 color space). This parametric surface can encompass the actual red primary of known HDR10 in-market displays, in one example. Color volume determining component 120 can similarly define parametric surfaces for other color volume vertices, such as at least one green primary, at least one blue primary, at least one white point and/or at least one black point, etc. For example, at least one white primary can generally be characterized by luminance (cd/m2) and correlated color temperature (CCT, e.g., in degrees Kelvin) as the two-dimensions for the parametric surface.

In method 200, optionally at action 204, a flat bitmap can be generated, for the at least one color volume vertex, by mapping, via a parametric equation, color space parameters corresponding to the two-dimensional parametric surface to pixel locations of the flat bitmap. In an example, bitmap component 122, e.g., in conjunction with processor 102, memory 104, operating system 106, color space determining component 112, etc., can generate, for the at least one color volume vertex, the flat bitmap by mapping, via the parametric equation, color space parameters corresponding to the two-dimensional parametric surface to pixel locations of the flat bitmap. In an example, bitmap component 122 can generate the flat bitmap as a rectangular shape, though the two-dimension parametric surface may have another shape, as described above. In an example, the parametric equation can be used to map the color space parameters of the two-dimensional parametric surface to the flat bitmap, and then also to map a selected point to a corresponding color value in the color space, as described further herein. In an example, the parametric equation can be obtained from memory 106 by the bitmap component 122, and can be defined for the given color volume vertex. For example, the parametric equation can be defined to select out a surface maximizing a color dimension from a larger color volume. Similarly, a corresponding parametric surface can be defined to encompass all reasonable valid color values for the color volume vertex and/or can select two independent dimensions that (e.g., by observation/knowledge of the industry) have a high level of variation between different individual displays and models.

Figure 5:
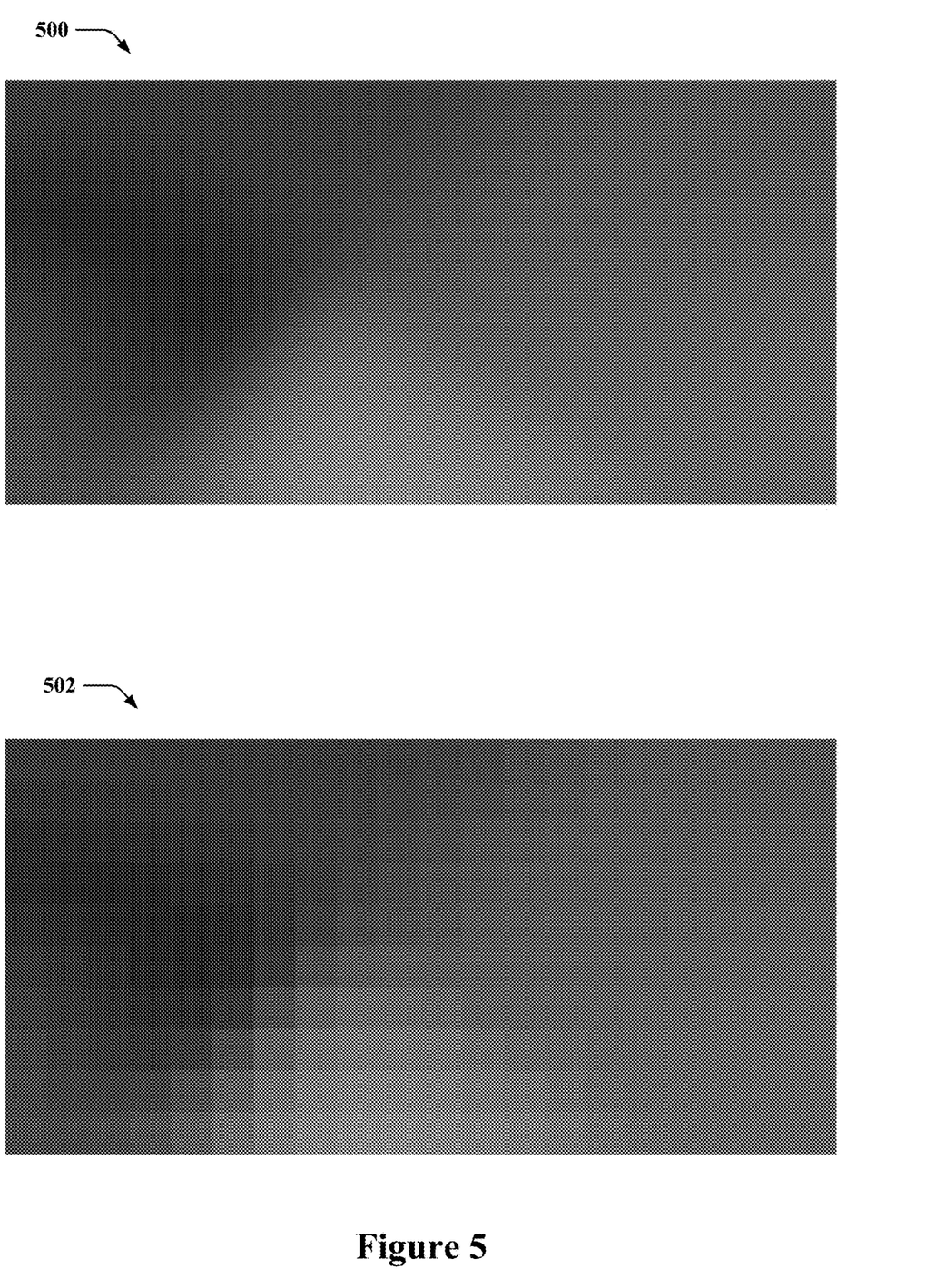
FIG. 5 is a diagram of a monochrome representation of an example of a flat bitmap and a pixelated flat bitmap to display for determining a maximum color volume vertex in accordance with examples described herein.

FIG. 5 illustrates an example of a flat bitmap 500 of a two-dimensional parametric surface obtained from a three-dimensional color volume. For example, the bitmap 500 can represent a two-dimensional "slice" of the three-dimensional color volume "cube" to render as a test pattern focusing on colors for the blue color primary. In an example, bitmap component 122 can generate the flat bitmap 500 representative of the two-dimensional parametric surface by stretching the surface to fit a resolution of display 108.

In method 200, in generating the flat bitmap at action 204, optionally at action 206, one or more filters can be applied to convert collections of pixels into discrete color blocks. In an example, bitmap component 122, e.g., in conjunction with processor 102, memory 104, operating system 106, color space determining component 112, etc., can apply the one or more filters to convert collections of pixels into discrete color blocks. For example, bitmap component 122 can determine the collections of pixels as an N×M block of pixels, where N can be equal or not equal to M, starting from a top or bottom corner of the bitmap and continuing vertically and/or horizontally. For each given collection, in one example, bitmap component 122 can apply a single color to all pixels in the collection. This can achieve a pixelization of the flat bitmap, which may allow for easier detection of a certain property in the flat bitmap, such as a pixel or collection of pixels where the color volume vertex converges, as described herein.

In one example, to enhance the ability for the human eye to distinguish differences between colors, bitmap component 122 can apply a pixelate filter and/or a quantization filter as follows: each block of N×N pixels (for example, 16 by 16) is filled in with the average color for that block, and the values of the colors can be quantized to the nearest number of color values, P. Bitmap component 122, in one example, can tune the parameters N and P to balance between increased precision (e.g., smaller blocks with smaller color differences between blocks) and ease of identifying color differences (e.g., bigger blocks with larger color differences between blocks). An example is illustrated in FIG. 5, which additionally depicts a pixelated flat bitmap 502 to facilitate more easily identifying the property in the flat bitmap for the blue color primary, such as the pixel or collection of pixels where the color volume vertex converges.

In method 200, at action 208, a flat bitmap to which the two-dimensional parametric surface is mapped can be displayed, on the display and for the at least one color volume vertex. In an example, bitmap component 122, e.g., in conjunction with processor 102, memory 104, operating system 106, color space determining component 112, etc., can display, on the display (e.g., display 108) and for the at least one color volume vertex, the flat bitmap to which the two-dimensional parametric surface is mapped. For example, as described, the flat bitmap can be stretched to fit a resolution of the display 108, and may be displayed in a pixelated form to ease detection of one or more properties of the flat bitmap. In addition, bitmap component 122 may display the flat bitmap as part of a calibration process performed for the display, which may be executed by the device 100 based on an application or operating system 106 process, executed by the display 108 as activated on the display 108, and/or the like.

In method 200, at action 210, a selection of a point on the flat bitmap that corresponds to a perceived maximum color can be received for the at least one color volume vertex.

In an example, max color component 124, e.g., in conjunction with processor 102, memory 104, operating system 106, color space determining component 112, etc., can receive, for the at least one color volume vertex, the selection of the point on the flat bitmap that corresponds to the perceived maximum color. For example, max color component 124 can receive a selection by a user (e.g., using a mouse to navigate to the pixel or collection of pixels representing the maximum color, using a touch panel to select, by touch, the pixel or collection of pixels representing the maximum color, etc.) for each flat bitmap representing each color volume vertex.

For example, the bitmap displayed on the display 108 can appear as a spectrum of different hues, similar to a color selecting tool in a paint or drawing application. However, because of the saturation behavior described above, a user may observe that some portion of the bitmap appears as a flat/constant color patch, which can be representative of colors that exceed the physical capabilities of the display 108, and are hence saturated/truncated to the same (nearest) color. In this example, the user can select the point on the flat bitmap that is the visual boundary between the saturated/flat section and the normal/spectrum section, e.g. with a cursor or touch. This boundary point can represent the maximum possible color corresponding to the current color volume vertex.

Figure 4:
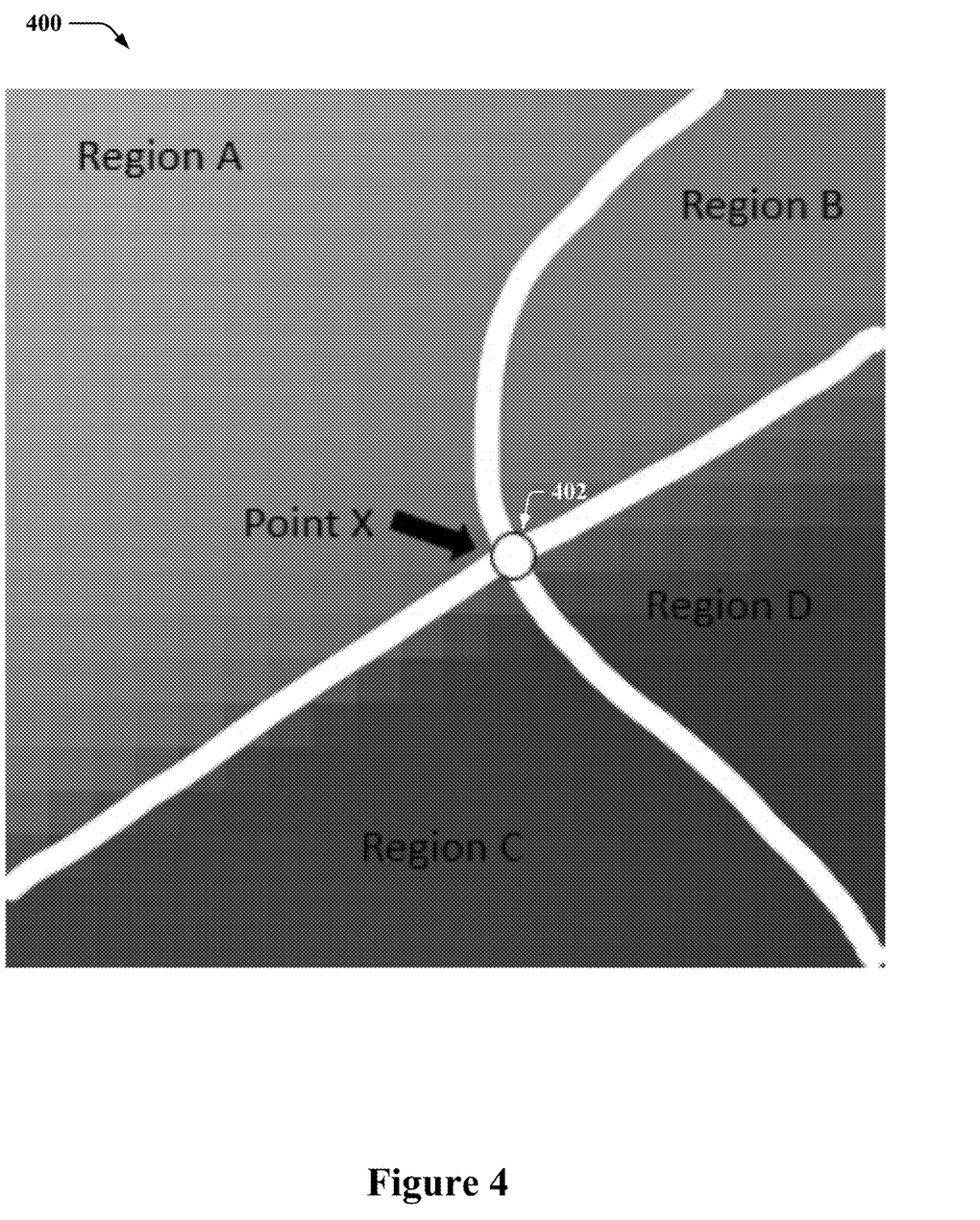
FIG. 4 is a diagram of a monochrome representation of an example of a flat bitmap to display for determining a maximum color volume vertex in accordance with examples described herein.

FIG. 4 illustrates a monochrome representation of an example of a pixelated flat bitmap 400 corresponding to the two-dimensional parametric surface defined in FIG. 3. In the example of FIG. 4, pixel 402 may be selected as the maximum color pixel for an effective color volume vertex before the colors saturate to the same or similar color in different dimensions. For example, color space determining component 112 can prompt a user to select the area of the image where the color blocks look the same or begin to look the same, and the user can select the area or point in the image, as described, based on the prompt. Conceptually, the selected point 402 can correspond to the intersection of Regions A, B, C, and D in the Figure.

Color space determining component 112 can, for example, map the selected area or pixel (or collection of pixels) to a color value displayed, based on the parametric function, that can be considered the maximum red color value. In another example, selection of the pixel or collection of pixels may cause bitmap component 122 to create another flat bitmap focused on the collection of pixels corresponding to the selection (e.g., and/or one or more neighboring collection of pixels) for a more granular determination of the maximum color value. In any case, once the maximum color value is selected for one or more intended color volume vertices, color space determining component 112 can determine the effective color space based on the various maximum vertices.

In method 200, at action 212, the effective color space for the display can be determined based at least in part on the perceived maximum color selected for the at least one color volume vertex. In an example, color space determining component 112, e.g., in conjunction with processor 102, memory 104, operating system 106, etc., can determine, based at least in part on the perceived maximum color selected for the at least one color volume vertex, the effective color space of the display. For example color space determining component 112 can determine the effective color space based at least on a maximum color selected for at least one red primary, at least one green primary, at least one blue primary, at least one white primary, and at least one black primary. In addition, in one example, the at least one white primary can include a ten percent window white point and a 100 percent window white point. In any case, color space determining component 112 can determine the effective color space for the display 108, or at least a portion of the effective color space (e.g., a luminance, chrominance, etc.) as actual color values representing the maximum color volume vertices, percentages of the actual color values as compared to the color values in the color volume defined for the display 108, and/or the like.

In method 200, optionally at action 214, the effective color space can be reported to a source for rendering images based on the effective color space. In an example, color space determining component 112, e.g., in conjunction with processor 102, memory 104, operating system 106, etc., can report the effective color space of the display (e.g., display 108) to the source (e.g., image source 114) for rendering images based on the effective color space, which may include transmitting the effective color space to the source (e.g., an application executing on device 100). In this regard, the image source 114 can consider the effective color space in rendering images for displaying on the display 108 such to minimize use of saturated colors in rendering the image. For example, the image source 114 may render or otherwise create images or instructions for displaying images to not exceed the maximum colors based on the effective color space. In one example, the image source 114 can truncate colors determined to be outside of the effective color space or can adjust colors based on a percentage of the effective color volume to the determined color space. In another example, image source 114 can adjust the colors via a tone mapping or gamut mapping operation used in this regard to more accurately render an image for the specific display.

Figure 6:
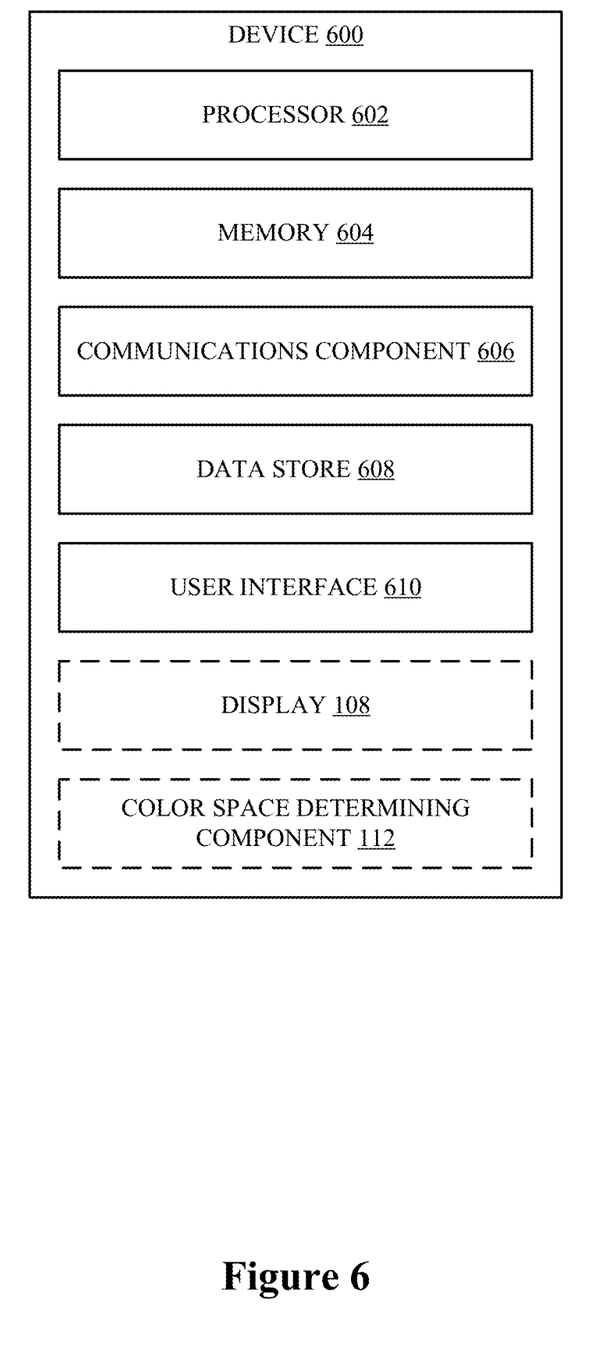
FIG. 6 is a schematic diagram of an example of a device for performing functions described herein.

FIG. 6 illustrates an example of device 600, similar to or the same as device 100 (FIG. 1) including additional optional component details as those shown in FIG. 1. In one implementation, device 600 may include processor 602, which may be similar to processor 102 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 104 such as for storing local versions of applications being executed by processor 602, such as color space determining component 112, an operating system (or other components thereof), applications, related instructions, parameters, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc., utilizing hardware, software, and services as described herein. Communications component 606 may carry communications between components on device 600 (e.g., display 108), as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with implementations described herein. For example, data store 608 may be or may include a data repository for applications and/or related parameters (e.g., color space determining component 112, an operating system (or other components thereof), applications, etc.) not currently being executed by processor 602. In addition, data store 608 may be a data repository for color space determining component 112, an operating system (or other components thereof), applications, and/or one or more other components of the device 600.

Device 600 may include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include and/or be communicatively coupled with one or more display devices, such as display 108, and/or a color space determining component 112 for determining an effective color volume, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for determining an effective color space of a display, comprising:
   defining, for at least one color volume vertex, a two-dimensional parametric surface that intersects a color volume of the display;
   displaying, on the display and for at least one color volume vertex, a flat bitmap to which the two-dimensional parametric surface is mapped;
   displaying, on the display, a prompt for a selection of a point on the flat bitmap that corresponds to a perceived maximum color;
   receiving, for at least one color volume vertex and based on the prompt, the selection of the point on the flat bitmap that corresponds to a perceived maximum color;
   determining, based at least in part on the perceived maximum color selected for the at least one color volume vertex, the effective color space of the display as a range of colors the display is capable of displaying; and
   transmitting the effective color space of the display to a source for rendering images based on the effective color space.

2. The method of claim 1, further comprising mapping, for the at least one color volume vertex, the two-dimensional parametric surface to the flat bitmap at least in part by mapping, via a parametric equation, color space parameters corresponding to the two-dimensional parametric surface to pixel locations of the flat bitmap.

3. The method of claim 2, wherein mapping the two-dimensional parametric surface to the flat bitmap comprises applying one or more filters to convert collections of neighboring pixels to discrete color blocks.

4. The method of claim 3, wherein applying the one or more filters comprises at least one of selecting, for each discrete color block, an average color for the discrete color block or quantizing the average color for the discrete color block to a nearest number of color values.

5. The method of claim 1, wherein the two-dimensional parametric surface for the at least one color volume vertex is defined to include a slice of the color space along two-dimensional chromaticity axes at a constant luminance.

6. The method of claim 1, wherein the two-dimensional parametric surface for the at least one color volume vertex, as a white point, is characterized by luminance and correlated color temperature.

7. The method of claim 1, wherein the at least one color volume vertex includes at least one red color primary, at least one green color primary, at least one blue color primary, at least one white point, and at least one black point.

8. The method of claim 7, wherein the at least one white point includes a ten percent window white point and a 100 percent window white point.

9. The method of claim 1, wherein the source includes an application executing on a computing device coupled to the display.

10. A device for determining an effective color space of a display, comprising:
    a memory storing one or more parameters or instructions for determining the effective color space of the display; and
    at least one processor coupled to the memory, wherein the at least one processor is configured to:
       define, for at least one color volume vertex, a two-dimensional parametric surface that intersects a color volume of the display;
       display, on the display and for the at least one color volume vertex, a flat bitmap to which the two-dimensional parametric surface is mapped;
       display, on the display, a prompt for a selection of a point on the flat bitmap that corresponds to a perceived maximum color;
       receive, for the at least one color volume vertex and based on the prompt, the selection of the point on the flat bitmap that corresponds to a perceived maximum color;
       determine, based at least in part on the perceived maximum color selected for the at least one color volume vertex, the effective color space of the display as a range of colors the display is capable of displaying; and
       transmit the effective color space of the display to a source for rendering images based on the effective color space.

11. The device of claim 10, wherein the at least one processor is further configured to map, for the at least one color volume vertex, the two-dimensional parametric surface to the flat bitmap at least in part by mapping, via a parametric equation, color space parameters corresponding to the two-dimensional parametric surface to pixel locations of the flat bitmap.

12. The device of claim 11, wherein the at least one processor is configured to map the two-dimensional parametric surface to the flat bitmap at least in part by applying one or more filters to convert collections of neighboring pixels to discrete color blocks.

13. The device of claim 12, wherein the at least one processor is configured to apply the one or more filters at least in part by at least one of selecting, for each discrete color block, an average color for the discrete color block or quantizing the average color for the discrete color block to a nearest number of color values.

14. The device of claim 10, wherein the two-dimensional parametric surface for the at least one color volume vertex is defined to include a slice of the color space along two-dimensional chromaticity axes at a constant luminance.

15. The device of claim 10, wherein the two-dimensional parametric surface for the at least one color volume vertex, as a white point, is characterized by luminance and correlated color temperature.

16. The device of claim 10, wherein the at least one color volume vertex includes at least one red color primary, at least one green color primary, at least one blue color primary, at least one white point, and at least one black point.

17. The device of claim 16, wherein the at least one white point includes a ten percent window white point and a 100 percent window white point.

18. The device of claim 10, wherein the source includes an application executed by the at least one processor.

19. A non-transitory computer-readable medium, comprising code executable by one or more processors for determining an effective color space of a display, the code comprising code for:
    defining, for at least one color volume vertex, a two-dimensional parametric surface that intersects a color volume of the display;
    displaying, on the display and for the at least one color volume vertex, a flat bitmap to which the two-dimensional parametric surface is mapped;
    displaying, on the display, a prompt for a selection of a point on the flat bitmap that corresponds to a perceived maximum color;
    receiving, for the at least one color volume vertex and based on the prompt, the selection of the point on the flat bitmap that corresponds to a perceived maximum color;
    determining, based at least in part on the perceived maximum color selected for the at least one color volume vertex, the effective color space of the display as a range of colors the display is capable of displaying; and
    transmitting the effective color space of the display to a source for rendering images based on the effective color space.

20. The non-transitory computer-readable medium of claim 19, further comprising code for mapping, for the at least one color volume vertex, the two-dimensional parametric surface to the flat bitmap at least in part by mapping, via a parametric equation, color space parameters corresponding to the two-dimensional parametric surface to pixel locations of the flat bitmap.

* * * * *